United States Patent [19]

Stolt et al.

[11] 3,835,394

[45] Sept. 10, 1974

[54] CODE RECEIVER IN STAFF LOCATOR

[75] Inventors: Nils Tomas Stolt, Bromma; Dag E:son Akerberg, Ektorp, both of Sweden

[73] Assignee: Telefonaktiebolaget L. M. Ericsson, Stockholm, Sweden

[22] Filed: Feb. 1, 1973

[21] Appl. No.: 328,685

[30] Foreign Application Priority Data

Feb. 9, 1972 Sweden .............................. 1500/72

[52] U.S. Cl. .................................. 325/321, 340/170

[51] Int. Cl. .............................................. H04b 5/04

[58] Field of Search ......... 325/55, 64, 65, 466, 321, 325/325; 340/170, 171 R, 171 PF, 311

[56] References Cited

UNITED STATES PATENTS

| | | | |
|---|---|---|---|
| 2,422,664 | 6/1947 | Feldman | 325/65 |
| 3,226,679 | 12/1965 | Malone | 340/171 R |
| 3,335,406 | 8/1968 | Clark | 325/55 |
| 3,510,777 | 5/1970 | Gordon | 325/64 |
| 3,628,150 | 12/1971 | Ditthardt | 325/64 |
| 3,628,153 | 12/1971 | Fukata | 325/64 |
| 3,665,313 | 5/1972 | Trent | 325/55 |

*Primary Examiner*—Benedict V. Safourek
*Assistant Examiner*—Jin F. Ng
*Attorney, Agent, or Firm*—Hane, Baxley & Spiecens

[57] ABSTRACT

A device is in a staff locator receiver for decoding of radio calls destined to that receiver. The device contains a bandpass filter, switchable between preselected frequencies. A decoder in the device contains purely digital circuits, i.e., a level detector, a pulse former, a pulse time supervisor which discards the call if a pulse in the call does not pass the bandpass filter within the correct time period, a stepping device which for each pulse advances one step and sets the bandpass filter in accordance with a code word assigned to the receiver and an alarm arrangement which signals when a complete call is accepted. A digital clock oscillator is common to all digital circuits. The decoder discriminates between two different call words assigned to one receiver, basing the discrimination on the type of start pulse for the call.

6 Claims, 2 Drawing Figures

CODE RECEIVER IN STAFF LOCATOR

Figure 1:
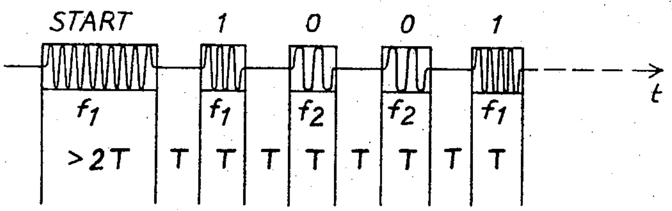

This invention relates to a device in a staff locator receiver, which device identifies calls destined to that receiver. The device according to the invention is intended preferentially for radio receivers.

It is known that, in staff locator receivers and communication receivers, use is made of devices which identify calls directed to the receiver. Such devices are based on the principle that the call is encoded, either with separate frequencies, high or low frequencies, or with signals of different duration. Several successively transmitted signals may be used in a call, so that the number of separate calls may be considerable. When the call contains several successive signals, the receiver usually contains a stepping device which sets the receiver solely for the signal which, having regard to the consecutive order of the signals in the call, is the correct one. Sometimes a bandpass filter in the receiver is connected for transmission within a selected frequency band. It is also known that the stepping device, when it has reached its last position, starts the transmission of an alarm signal implying that all bits of the call signal destined for that receiver have been correctly received. An example is the German published patent application No. 1 922 445.

In the device according to the present invention the received call signals are converted into digital signals and the latter are evaluated in digital circuits. Time determinations are also carried out digitally. With this device such advantages are gained as that a large number of separate call signals can be distinguished without the design of the distinguishing circuits becoming critical and difficult to implement. The forms adapted for the functions to be performed and the conversion to digital signals have made it possible for implementation of the device, to make use of microminiaturized circuits, which are known in principle. Thus there is gained the important advantage that the device is extremely small.

The device according to the invention is designed to identify a call consisting of a fairly large number of signals, e.g., ten signals. The device is characterized especially in that it is designed to supervise the time interval between the signals. The time interval between the signals is intended to be constant. If an expected signal does not appear, this is an indication that the signal has been rejected by the device and that, accordingly, the call was destined for another receiver. The transmission of a call is initiated by a signal in the form of a start pulse, and it is characteristic of one realization of the invented device that it can distinguish between different kinds of start pulses and, depending on the kind of start pulse, be caused to react to different calls. The start pulse is followed by a number of signals in the form of code pulses. The received signals are converted by a level detector in the device into digital signals and are processed by a digital pulse former and a digital pulse supervisor. For the time calculation use is made of digital, in this case binary, counters which count clock pulses from a clock pulse generator common to the entire device. As the device contains only one clock pulse generator, special arrangements for synchronization of the time measurements are not necessary. For the issue of alarms as well, use is made of pulses from the clock pulse generator so that a separate alarm signal generator is not required. The characteristic features of the device according to the invention are set out in detail in the subsequent claims.

Figure 2:
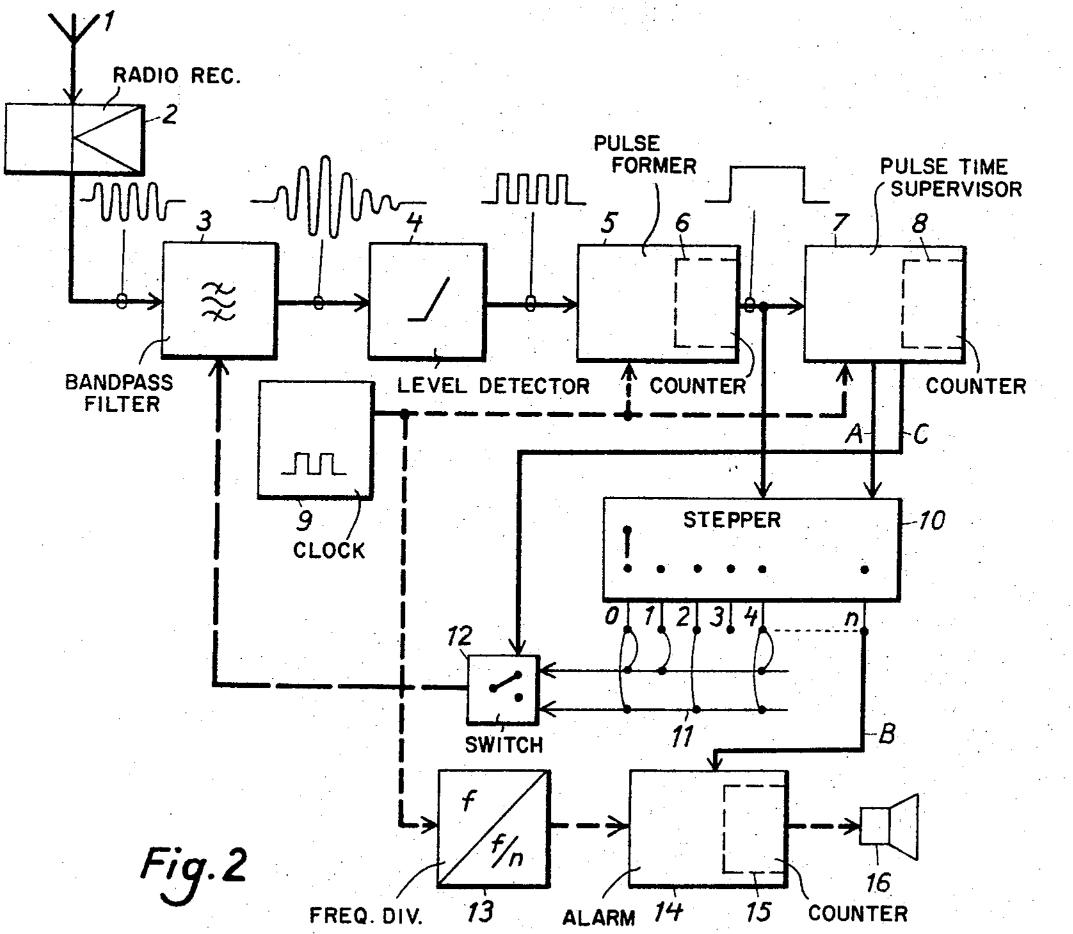

The device will be more closely described in below with reference to the accompanying drawing, in which FIG. 1 is a timing diagram showing some of the low frequency alternating current pulses in a call, and FIG. 2 is a block diagram of a staff locator including a device according to the invention.

In the described example it is assumed that the call is encoded having low frequency alternating current pulses with frequencies $f_1 = 2.0$ kHz and $f_2 = 1.5$ kHz. The duration T of the code pulses in FIG. 1 is assumed to be 10 ms. The code pulses are preceded by a start pulse with a duration of at least 2T = 20 ms, the frequency of the start pulse always being $f_1 = 2.0$ kHz. It is also assumed that the number of code pulses apart from the start pulse is ten. The device according to the invention can also be based on other numerical values of frequencies and durations than those here presented.

The staff locator in FIG. 2 receives radio waves through its aerial 1 and amplifies and demodulates them in a radio receiver 2. The resulting signals with frequency $f_1$ or $f_2$ are brought into the device according to the invention and processed in it, first in a bandpass filter 3. This can be set so as to transmit signals either with frequency $f_1$ or with frequency $f_2$. If the bandpass filter is set so that the frequency of the received signal falls outside its passband, no signal is received from the filter. If the bandpass filter is set so that the frequency of the received signal falls within the passband of the filter, a signal is received from the filter.

Output signals from the bandpass filter 3 are further processed in the level detector 4. This delivers a DC pulse once during each cycle of the AC voltage, provided that the peak value of the AC voltage exceeds a preselected limit. The transmitted pulse has a preselected unchangeable amplitude and a duration roughly equal to half the cycle of the AC voltage. The duration is therefore dependent on the frequency of the AC voltage signal. Pulse trains, each containing DC pulses repeated at a frequency identical to the frequency of the low frequency AC voltage fed to the bandpass filter and of duration roughly equal to the pulse time T of the AC voltage, will thereby be transmitted from the level detector.

Pulse trains leaving the level detector 4 are further processed in a pulse former 5. A short pulse fed to the pulse former causes the pulse former to transmit a DC voltage pulse with a duration, in this example, of 5 ms. If a new pulse arrives while a formed pulse is being transmitted, the transmitted pulse is lengthened so as not to be interrupted until 5 ms after the last arrived short pulse. The pulse former 5 will thereby deliver a continuous DC voltage pulse even if a small number of short input pulses is lacking in the pulse train from the level detector; if the interruption is shorter than the pulse which the pulse former is arranged to deliver, the interruption will not be noticeable in the pulse fed from the pulse former.

The pulse-lengthening effect of the pulse former is achieved by means of an electronic binary counter 6 which, as soon as a pulse arrives from the level detector 5, starts to count a predetermined number of pulses from a clock oscillator 9 in the device and, during the counting, a DC voltage is delivered from the pulse former. If a new pulse arrives while the counter 6 is counting, the counter is reset to zero and starts counting again. When the counter has reached the predetermined number of clock pulses, implying that the pulse train from the level detector 4 has been completed, further counting and transmission of DC voltage is interrupted. The clock oscillator in the device is arranged in the example described to deliver clock pulses with frequency 6.4 kHz. The counter in the pulse former is arranged to count 32 clock pulses, which means that it counts during a period of 5 ms.

The subsequent processing of DC voltage pulses fed from the pulse former 5 is carried out by a pulse time supervisor 7. When the staff locator is put into service, the pulse time supervisor is preset to supervise the duration of each pulse fed to it. If the duration is less than 2T, the pulse time supervisor will not react. If the duration of the pulse is 2T or more, it will be considered to be a start pulse; in this case the pulse time supervisor delivers a signal A, whereby subsequent parts of the device are prepared for the reception of code pulses. Only after reception of a start pulse can the device receive and decode code pulses.

The action of the pulse time supervisor 7 is brought about by an electronic binary counter 8 in it which counts clock pulses from the aforesaid clock oscillator. In the case described the counter is arranged to count 128 clock pulses with frequency 6.4 kHz, which means that it counts during a period of 20 ms = 2T.

Signal A from the pulse time supervisor 7, implying that a start pulse has been received, is transmitted to an electronic stepping device 10 in the device and sets the stepping device 10 in starting position for counting of code pulses following after the start pulse. The stepping device 10 is also arranged for reception of pulses fed from the pulse former 5. At the end of each pulse fed from the pulse former the stepping device advances one step. For each position of the stepping device the frequency to which the bandpass filter shall be set for reception of the next code pulse is determined by a jumper 11 inserted as prescribed by the code for the staff locator in question. If the frequency of the next code pulse is such that the pulse can pass through the filter, the stepping device is caused to advance one step.

The transmission of signal A causes the electronic counter 8 of the pulse time supervisor to be switched over for counting of clock pulses during the intervals between the pulses. In this way the duration of the intervals is supervised. If the duration of an interval amounts to 2T or more, this means that a code pulse has failed to appear, the most probable reason being that the frequency of the code pulse did not correspond to the setting of the bandpass filter 3; this means that the received call was destined for another receiver. When an interval detected by the pulse time supervisor 7 is too long, the latter delivers a signal A to the stepping device once again, which is thereby reset to wait for a new start pulse. The stepping device 10 will thus disregard any code pulses following after too long an interval.

The process of supervision of the interval between the code pulses and setting of the bandpass filter is repeated so that, if the frequencies of all pulses received by the device correspond to the code set in the staff locator, the stepping device reaches its end position.

The stepping device 10 is so arranged that, when it reaches its end position, it transmits a signal B to an alarm arrangement 14 in the device and thereafter returns to its starting position. On reception of the signal B the alarm arrangement 14 delivers a signal to the carrier of the staff locator. In the device described an audible signal is delivered by a loudspeaker 16 in the staff locator fed with clock pulses having a frequency suited for the signalling. In the case described the loudspeaker is fed with the frequency 3.2 kHz. Clock pulses with this frequency are produced by a frequency divider 13 which is connected between the alarm arrangement 14 and the aforesaid clock oscillator 9 and divides the frequency of the clock oscillator by 2. Division by other numbers than 2 can be adopted if another frequency of the audible signal is desired. The duration of the alarm signal is determined by an electronic binary counter 15 in the alarm arrangement. In the example described the counter is arranged to count 256 clock pulses with frequency 3.2 kHz, which means that the alarm signal has a duration of 80 ms.

It is possible with the staff locator to deliver alarm signals of different characters by varying the number of alarm signals and the intervals between them. The alarm signal is transmitted every time the staff locator receives a new call. In this way alarm signals can be repeated at intervals of down to 0.1 second. The duration of every alarm signal is, as noted, determined in the alarm arrangement 14 of the receiver.

In one embodiment of the decoding device of the staff locator-receiver the pulse time supervisor 7 is designed to deliver a first signal A when an incoming pulse has a duration of 2T and, in addition, a second signal C when the duration is 4T. The first signal A implies that a start pulse has been received; the process then started in the device has already been described. The second signal C implies that a start pulse of another kind has been received; this is used to cause a switch 12 to switch over the device so as to compare incoming code pulses with a second code set in the staff locator. This second code can advantageously be made identical for several staff locators in the same plant; the code may therefore be said to be a group code. The first named code should be inserted in only one staff locator. In the manner previously described a staff locator can be controlled to deliver different types of alarm signals to indicate whether it has received a group call or an individual call.

Falling under the scope of the invention there are also devices, described here and in the claims, for other frequencies, other pulse times and other numbers of pulses than in the example described. The invention shall also be considered to comprise, for example, code receivers in communication radio receivers and in staff locators and communication receivers working with line transmission.

What is claimed is:

1. Device for decoding of coded pulse trains transmitted by radio, which pulse trains consist of pulses of alternating voltage with different frequencies, the device comprising a radio receiver, a band-pass filter connected to the receiver and switchable between different preselected frequencies, a level detector means connected to the output of the bandpass filter for delivering a DC voltage pulse with a preselected amplitude and a duration substantially equal to half the cycle of an alternating voltage delivered from the bandpass filter, a pulse former means connected to the output of the level detector means for lengthening the duration of the voltage pulse delivered from the level detector means to a preselected duration, which duration being of about the same duration as that of a pulse of alternating voltage delivered by the receiver, a pulse time supervisor means connected to the output of the level detector means for delivering a stepping signal upon receiving from the pulse former means a start pulse of a duration at least equal to a predetermined duration and also upon receiving subsequent code pulses and for delivering an inhibiting signal when a time interval between code pulses following the above mentioned start pulse exceeds a predetermined duration, a stepping means having an input connected to the output of the pulse former means and an output of the pulse time supervisor means for being set in starting position upon receiving the stepping signal from the pulse time supervisor means and for advancing one step for each subsequent stepping signal received from the level detector, said stepping means including first means for giving the bandpass filter which is connected to an output thereof a frequency setting assigned to each position of the stepping device according to a predetermined set code and second means for being reset to idle position on receiving an inhibiting signal from the pulse time supervisor means and third means for delivering on reaching an end position an acknowledgment signal, an alarm means connected to an output of the stepping means for producing an alarm signal on receiving the acknowledgment signal from the stepping means, and a loudspeaker means connected to the output of the alarm means for producing an audible signal when receiving the alarm signal from the alarm means.

2. Device according to claim 1 provided with a switch means having an input connected to an output of the stepping means and to an output of the pulse time supervisor means, said switch means being actuated by the pulse time detector means when a start pulse of at least twice the duration of said predetermined duration is determined, said switch means including means when, in its actuated state for connecting the bandpass filter to the stepping means in such manner for allowing the bandpass filter to be controlled in accordance with a second code set in the stepping device.

3. Device according to claim 1, where the pulse former means is provided with a digital counter means for counting, starting from zero, on delivery of a DC voltage signal from the level detector means, of at most a selected number of clock pulses, the selected number corresponding to the duration of said pulse from the pulse former means, and for again counting from zero at the start of every delivery of a DC voltage signal from the level detector means.

4. Device according to claim 3, where the pulse time supervisor means is provided with a digital counter means for counting, simultaneously with a pulse from the pulse former means, of a first preselected number of clock pulses, the selected number corresponding to the duration of said start pulse, and a second number of clock pulses, twice as large as the first, corresponding to a second kind of start pulse, and also for counting with said digital counter, after reception of either of the aforesaid kinds of start pulses, during the intervals between the pulses, of said first number of clock pulses, and for signalling to the pulse time supervisor on attainment of either or both said numbers of clock pulses.

5. Device according to claim 4, provided with one clock oscillator means connected to the level detector means and to the pulse time supervisor means for transmitting clock pulses to all the digital counters with a preselected unchangeable frequency about four times as high as that of the alternating voltages in the pulses in the pulse trains delivered to the bandpass filter.

6. Device according to claim 5, where the alarm means is connected to said clock oscillator means and where the alarm means includes frequency divider means operative, after actuation from the stepping means, for delivering a low frequency pulse train and a digital counter means for counting of a preselected unchangeable number of the clock pulses and, when the selected number of clock pulses has been reached, for causing the alarm means to interrupt the transmission of pulses.

* * * * *